United States Patent
Beck et al.

(10) Patent No.: US 11,912,166 B2
(45) Date of Patent: Feb. 27, 2024

(54) METHODS AND SYSTEM FOR OPERATING A FUEL CELL VEHICLE

(71) Applicant: Ford Global Technologies, LLC, Dearborn, MI (US)

(72) Inventors: David Beck, Ann Arbor, MI (US); Walter Joseph Ortmann, Saline, MI (US); Kenneth James Miller, Pinckney, MI (US); Thomas Joseph Cusumano, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 938 days.

(21) Appl. No.: 16/443,532

(22) Filed: Jun. 17, 2019

(65) Prior Publication Data
US 2020/0391615 A1    Dec. 17, 2020

(51) Int. Cl.
*B60L 58/30*    (2019.01)
*B60L 50/70*    (2019.01)
*H01M 8/04858*  (2016.01)

(52) U.S. Cl.
CPC .......... *B60L 58/30* (2019.02); *B60L 50/70* (2019.02); *B60L 2240/68* (2013.01); *B60L 2250/00* (2013.01); *B60L 2250/26* (2013.01); *H01M 8/04932* (2013.01); *H01M 2250/20* (2013.01)

(58) Field of Classification Search
CPC ...... B60L 58/30; B60L 50/70; B60L 2240/68; B60L 2250/00; B60L 2250/26
USPC .......................................................... 701/22
See application file for complete search history.

(56) References Cited

U.S. PATENT DOCUMENTS

| | | | |
|---|---|---|---|
| 7,133,767 B2 | 11/2006 | Ogino et al. | |
| 7,482,074 B2 | 1/2009 | Yoshida et al. | |
| 8,630,759 B2 | 1/2014 | Bauerle | |
| 2005/0139399 A1* | 6/2005 | Gopal | H01M 8/0494 180/65.1 |
| 2009/0069975 A1* | 3/2009 | Logan | H01M 10/44 701/36 |
| 2011/0246013 A1* | 10/2011 | Yee | B60W 10/26 180/65.265 |
| 2012/0123640 A1* | 5/2012 | Mukaiyama | G08G 1/096741 701/1 |
| 2012/0171585 A1* | 7/2012 | Mueller | H01M 8/04111 429/429 |
| 2015/0004508 A1* | 1/2015 | Sato | H01M 8/04776 429/432 |
| 2015/0100189 A1 | 4/2015 | Tellis et al. | |
| 2016/0200319 A1* | 7/2016 | Nemoto | G05D 1/0293 701/96 |
| 2018/0288589 A1* | 10/2018 | Punithan | H04W 28/02 |
| 2020/0391615 A1* | 12/2020 | Beck | H01M 16/006 |

FOREIGN PATENT DOCUMENTS

JP    3984523 B2    10/2007

\* cited by examiner

*Primary Examiner* — Jacob S. Scott
*Assistant Examiner* — Michael E Butler
(74) *Attorney, Agent, or Firm* — David Kelley; McCoy Russell LLP

(57) ABSTRACT

Methods and systems are described for controlling output of a fuel cell that generates electrical power for an electric machine that propels a vehicle. In one example, a driver demand power reduction is anticipated and output of the fuel cell is adjusted before the driver demand power is reduced so that a greater amount of electric charge may be stored in an electric energy storage device.

19 Claims, 10 Drawing Sheets

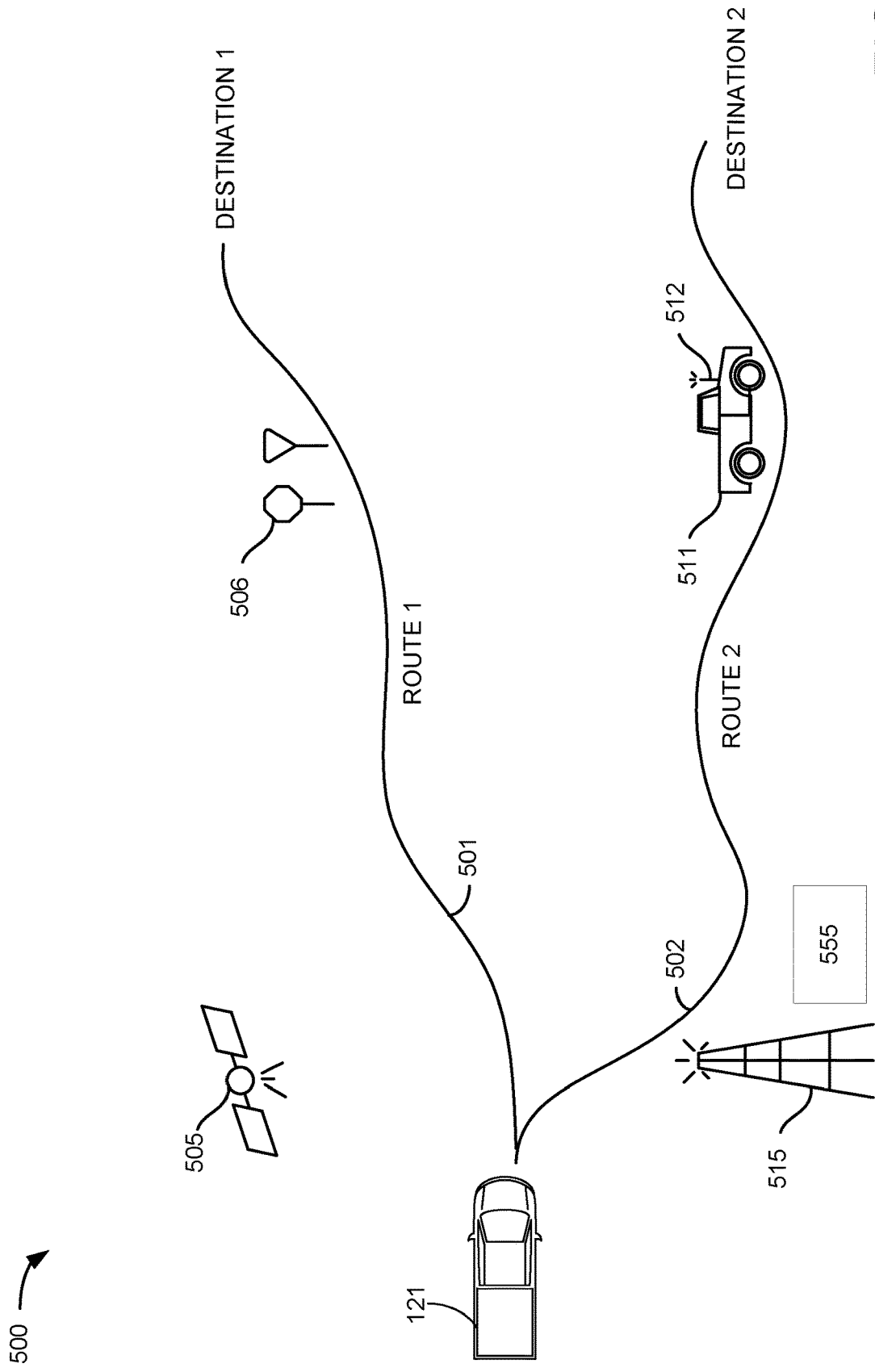

(12) United States Patent

METHODS AND SYSTEM FOR OPERATING A FUEL CELL VEHICLE

FIELD

The present description relates generally to methods and systems for anticipating a change in an amount of power consumed by a fuel cell vehicle. The methods and systems may anticipate reductions in power consumed by a fuel cell vehicle so that regenerative braking may be improved.

BACKGROUND/SUMMARY

A fuel cell of a vehicle may convert fuel into electric power and the electric power may be applied to propel the vehicle. The fuel cell may split a $H_2$ molecule into to $H^+$ ions and two free electrons. In addition, the fuel cell may allow the $H^+$ ions to combine with an oxygen atom to form $H_2O$. One cell of a fuel cell may generate a small voltage (e.g., 0.7 volts) and cells of the fuel cell may be combined in parallel and series to increase capacity and voltage output of a fuel cell. However, the voltage and current that is output by the fuel cell may not change instantaneously. Further, output power of the fuel cell may not change as dynamically as a driver demand power may change as a requested driver demand power. Consequently, if output of the fuel cell is commanded to simply follow a driver demand power, then vehicle performance may not meet the driver demand during some conditions. However, during other operating conditions, the fuel cell output power may exceed driver demand power so that some of the fuel cell output power may be stored to an electric energy storage device. Nevertheless, the electric energy storage device may not always have capacity to store charge from the fuel cell. Therefore, it may be desirable to provide a way of adjusting fuel cell output power so that driver demand power may be more closely followed via a fuel cell.

The inventors herein have recognized the above-mentioned issues and have developed a vehicle operating method, comprising: anticipating a reduction in driver demand power via a controller; reducing power output of a fuel cell to an electric machine in response to anticipating the reduction in driver demand power before the reduction in driver demand power; and increasing electric power consumed from an electric energy storage device via the electric machine in response to reducing power output of the fuel cell.

By anticipating a reduction in driver demand power, it may be possible to reduce electrical output of a fuel cell so that an electric energy storage device does not have to simultaneously store charge from the fuel cell and an electric machine due to regenerative braking. In particular, amounts of air and fuel that are supplied to the fuel cell may be reduced before an actual reduction in driver demand power so that electrical output of the fuel cell may be reduced before the actual reduction in driver demand power. The reduction in output of the fuel cell may be compensated by increasing an amount of electric power drawn from an electric energy storage device. Consequently, driver demand power may continue to be met up to a time when the actual driver demand power is reduced. The power that is generated via the electric machine may then be stored without the electric energy storage device having to store power generated via the fuel cell since electrical power output by the fuel cell has already been reduced.

The present description may provide several advantages. In particular, the approach may permit a greater amount of regenerated electric power to be stored in an electric energy storage device. Further, the approach may also allow driver demand power to be met when driver demand power increases quickly. In addition, the approach may anticipate changes in driver demand power so that a fuel cell may meet driver demand power requests.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 is a sketch showing additional infrastructure and a global positioning system for anticipating driver demand power;

DETAILED DESCRIPTION

Figure 1:
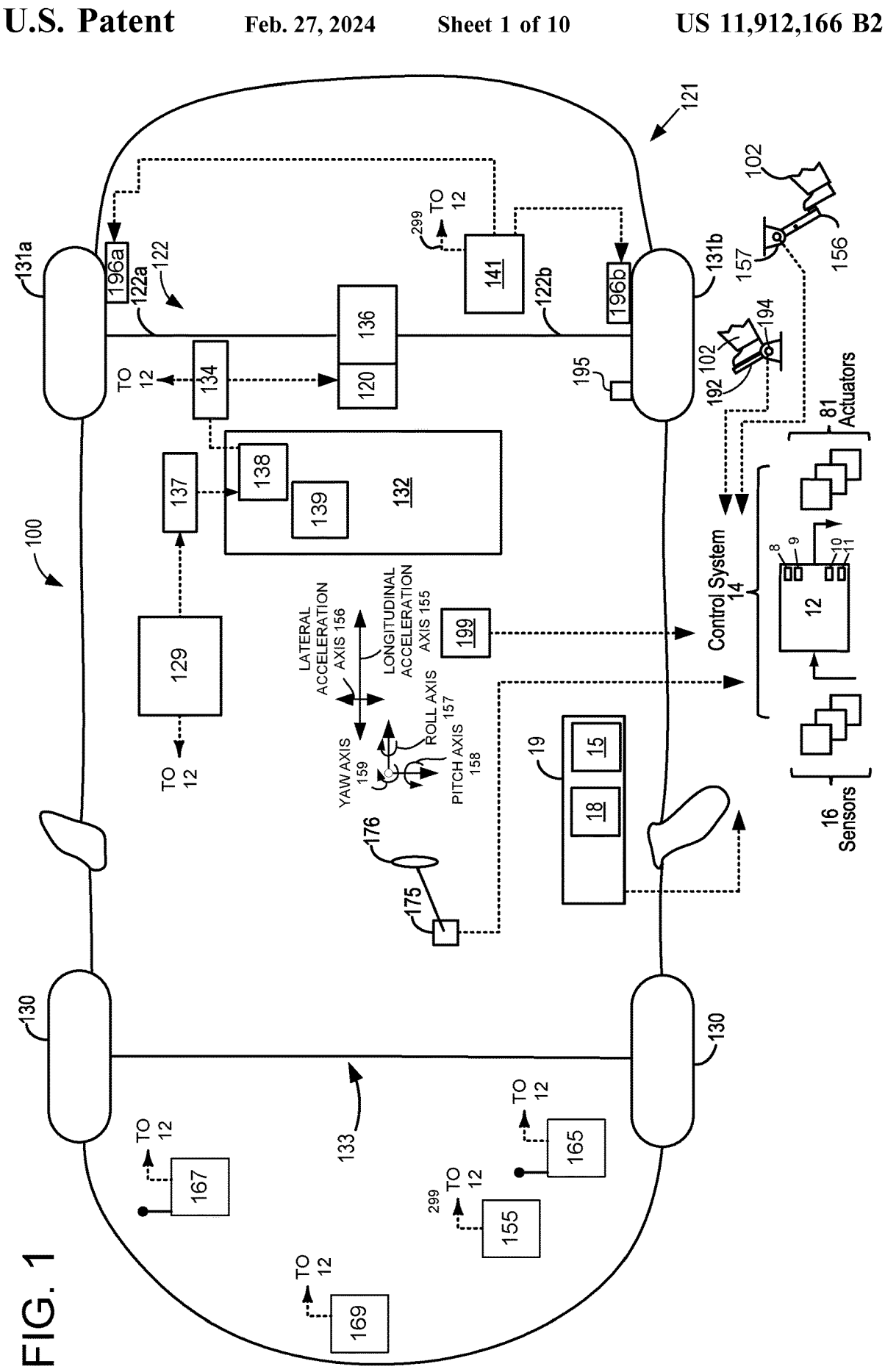
FIG. 1 is a schematic diagram of an example vehicle driveline.
Figure 2:
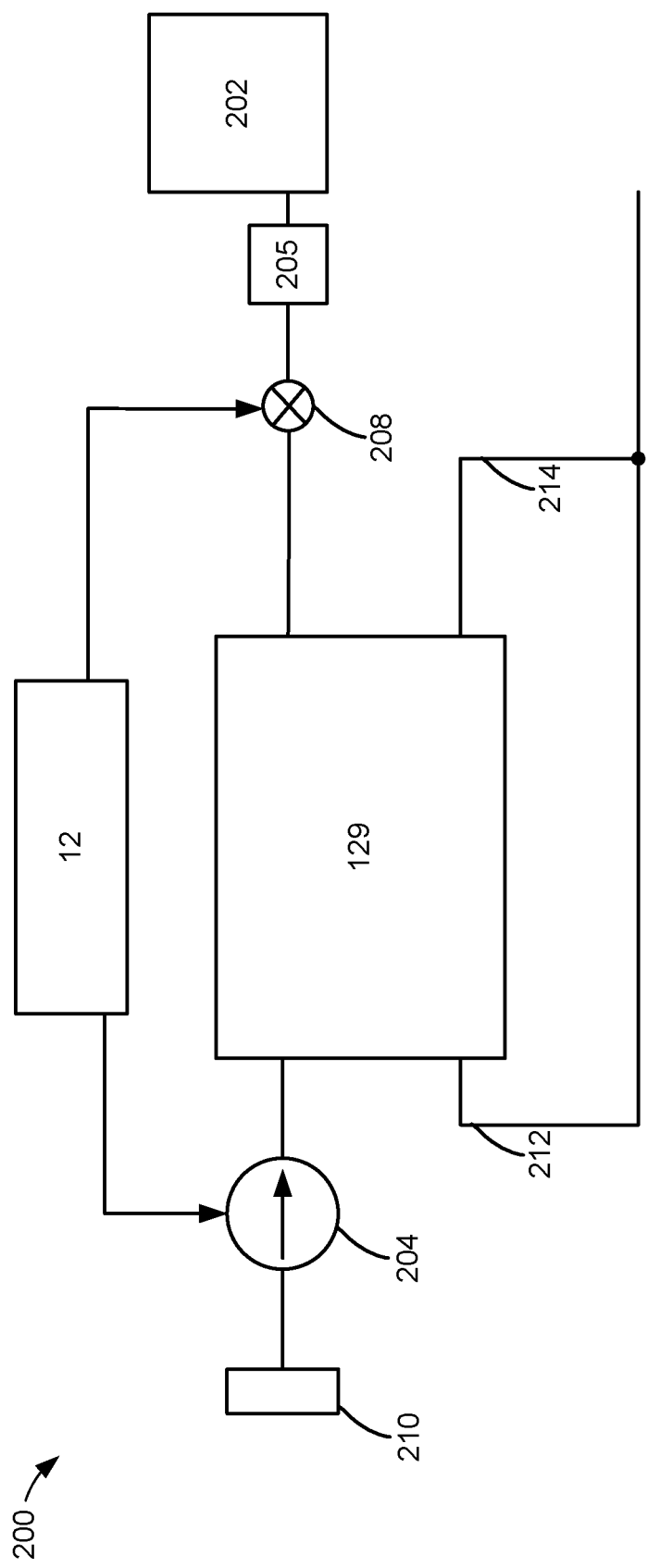
FIG. 2 is a block diagram of an example fuel cell configuration.
Figure 4:
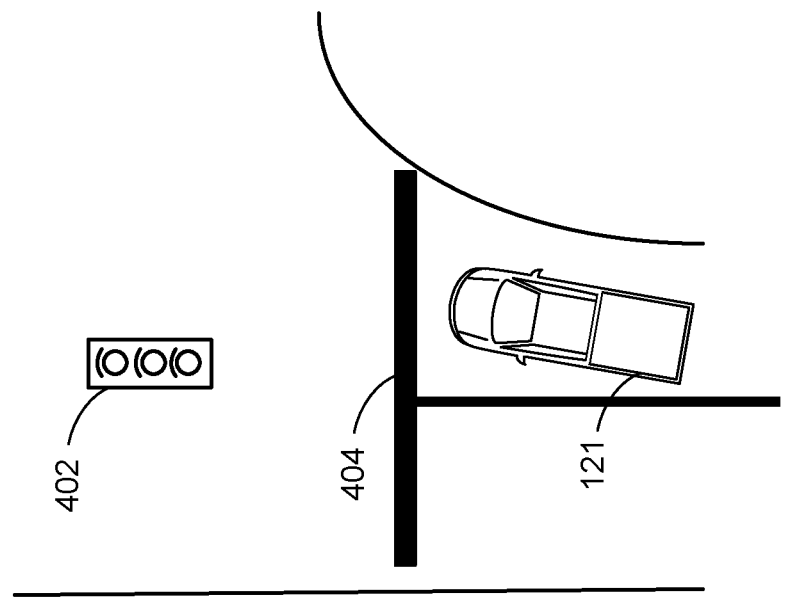
FIG. 4 is a sketch showing infrastructure for anticipating driver demand power.
Figure 3:
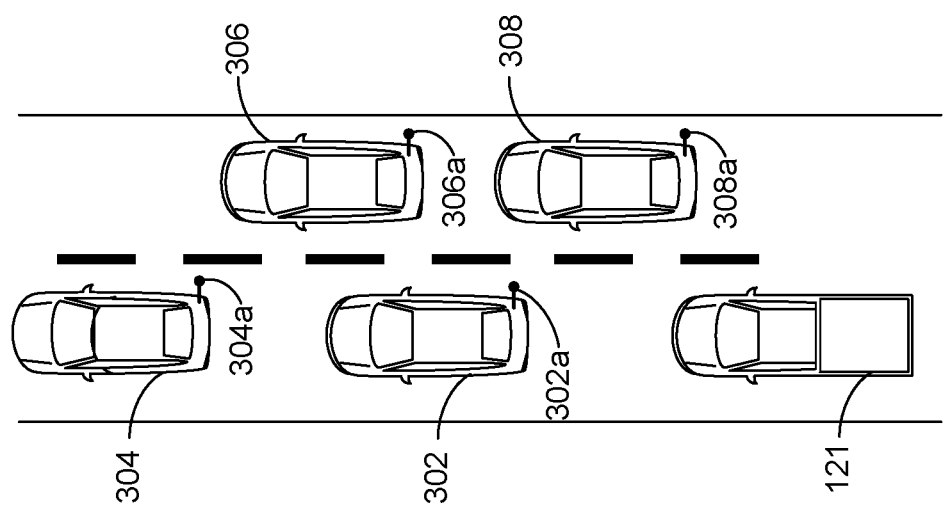
FIG. 3 is a sketch showing data sources for anticipating driver demand power.

The following description relates to systems and methods for operating a vehicle that includes a fuel cell. An example vehicle driveline is shown in FIG. 1. A fuel cell included in the driveline of FIG. 1 is shown in FIG. 2. The method and system described herein may retrieve data from vehicles and infrastructure as shown in FIGS. 3-5. Example fuel cell operating sequences are shown in FIGS. 6-9. A method for operating a vehicle that includes a fuel cell is shown in FIGS. 10 and 11.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122*a*, and second half shaft 122*b*. Vehicle propulsion system 100 further has front wheels 130 and rear wheels 131*a* and 131*b*. The rear axle 122 is coupled to wheels 1311*a* and 131*b*. The rear axle 122 may be driven via electric machine 120 (e.g., motor/ generator). Differential gear set (e.g., differential) 136 may transfer power from electric machine 120, to axle 122, resulting in rotation of drive wheels 131*a* and 131*b*.

Control system 14 and controller 12 may communicate with one or more of electric machine 120, inverter 134, fuel cell 129, camera 155, distance to object sensing device (e.g., radar or lidar) 169, brake controller 141, etc. Control system 14 and controller 12 may receive sensory feedback information from one or more of electric machine 120, inverter 143, fuel cell 129, camera 155, distance to object sensing device 169, brake controller 141, etc. Further, control system 14 may send control signals to one or more of engine electric machine 120, inverter 134, fuel cell 129, brake controller 141, etc., responsive to this sensory feedback. Control system 14 may receive an indication of an operator requested output of the vehicle propulsion system (e.g., a driver demand power) from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156. Further, control system 14 and controller 12 may receive traffic and vehicle surrounding conditions from camera 155. Control system 14 and controller 12 may also receive vehicle position information from global positioning system receiver 165. Control system 14 and controller 12 may retrieve road grade and route information (e.g., locations of road intersections, traffic signals, etc.) from maps stored in controller read only memory. Control system 14 and controller 12 may receive and send data to other vehicles and/or infrastructure (e.g., traffic signal controller, traffic control systems, cloud servers, vehicle service centers, etc.) via transceiver 167. Controller 12 includes a central processing unit 8, random accesses memory 9, read only memory 10, and input/output ports 11 for receiving and transmitting signals and data.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a brake system control module (BSCM) 141. In some examples, BSCM 141 may comprise an anti-lock braking system, such that wheels (e.g. 130, 131*a*, 131*b*) may maintain tractive contact with the road surface according to driver inputs while braking, which may thus prevent the wheels from locking up, to prevent skidding. In some examples, BSCM may receive input from wheel speed sensors 195. Further brake system control module 141 may communicate with controller 12 via CAN 299. BSCM may apply right friction brakes 196*a* and left friction brakes 196*b* to apply torque to rotors (not shown) that are coupled to half shafts 122*a* and 122*b* to slow wheels 131*a* and 131*b*.

Dashboard 19 may include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 120) based on an operator input. Various examples of the operator ignition interface 15 may include interfaces that require a physical apparatus, such as an active key, that may be inserted into the operator ignition interface 15 to start the electric machine 120 and turn on the vehicle, or may be removed to shut down the electric machine 120 and turn off the vehicle.

Several of the vehicle's axes relative to its environment are indicated via arrows 155-159. In particular, the longitudinal acceleration axis of vehicle 121 is indicated by arrow 155. The lateral acceleration axis of vehicle 121 is indicated by arrow 156. The roll axis of vehicle 121 is indicated by arrow 157. The pitch axis of vehicle 121 is indicated by arrow 158. The yaw axis of vehicle 121 is indicated by arrow 159. It should be noted that the various axes have been placed in a location that is convenient for display and general direction indication; however, the actual axes may vary from the position shown as they may actually fall about the vehicle's center of gravity (not shown), for example.

Electric machine 120 may receive electrical power from onboard electrical energy storage device 132. Furthermore, electric machine 120 may provide a generator function to convert the vehicle's kinetic energy into electrical energy, where the electrical energy may be stored at electric energy storage device 132 for later use by the electric machine 120. An inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Fuel cell 129 may generate electric power that is supplied to DC/DC converter 137 for charging electric energy storage device 132 and/or providing electric power to electric machine 120.

Control system 14 may communicate with one or more of electric machine 120, energy storage device 132, clutches 191 and 193, and braking controller 141. Control system 14 may receive sensory feedback information from one or more of electric machine 120, energy storage device 132, etc. Further, control system 14 may send control signals to one or more of electric machine 120, clutches 191 and 193, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Electric energy storage device 132 includes an electric energy storage device controller 139. Electric energy storage device controller 139 may provide charge balancing between energy storage element (e.g., battery cells) and communication with other vehicle controllers (e.g., controller 12). Electric power may be distributed to or from electric energy storage device via distribution box 138.

Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. The control system may adjust electric machine output and/or the torque vectoring electric machines to increase vehicle stability in response to sensor(s) 199.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

The systems of FIG. 1 show controller 12 and braking controller 141, but the methods and systems described herein are not limited to one configuration. Rather, the system may include a single controller or it may distribute control via additional controllers. For example, the system may include a separate controllers configured in hardware and in the form of a vehicle controller, an engine controller, an electric machine controller, a braking system controller, and a vehicle stability controller. Alternatively, the system may include a single controller configured in hardware for performing the method described herein. Thus, the system described herein should not be construed as limiting.

Thus, the system of FIG. 1 provides for a vehicle system, comprising: a vehicle including an accelerator pedal; a fuel cell; an electric energy storage device; an electric machine coupled to a wheel; and a controller including executable instructions stored in non-transitory memory to anticipate a reduction in driver demand power via the controller in response from data retrieved from off-board the vehicle and decrease electrical output of the fuel cell in response to anticipating the reduction in driver demand power. The vehicle system further comprises additional instructions to request data from one or more vehicles to anticipate the reduction in driver demand power. The vehicle system further comprises additional instructions to anticipate an increase in driver demand power. The vehicle system further comprises additional instructions to decrease fuel and air supplied to the fuel cell in response to anticipating the reduction in driver demand power. The vehicle system includes where the data retrieved from off-board the vehicle is retrieved from infrastructure.

FIG. 2 shows a high level block diagram 200 of a fuel cell system. Fuel cell 129 is supplied air via air filter 210 and pump or compressor 204. Fuel cell 129 is also supplied a fuel (e.g., $H_2$) from fuel storage tank 202. The fuel may be supplied in a form of a gas and regulator 205 controls the pressure of gas exiting fuel storage tank 202. Valve 208 may be opened to allow fuel to flow from fuel storage tank 202 to fuel cell 129. Anode exhaust may exit fuel cell 129 via pipe 212 and cathode exhaust may exit fuel cell 129 at pipe 214. Pipes 212 and 214 are shown converging before the exhaust gas is released to atmosphere. In some examples, a portion of anode and cathode exhaust gases may be returned to fuel cell 129 via one or more passages (not shown).

Controller 12 may increase an amount of electric power that is output from fuel cell 129 via increasing air flow through pump 204 and fuel flow through valve 208. For example, controller 12 may increase air flow through pump 204 via increasing an amount of electric power that is delivered to pump 204. Controller 12 may increase fuel flow to fuel cell 129 by increasing an opening amount of valve 208. Controller 12 may also decrease an amount of electric power that is output from fuel cell 129 via deceasing air flow through pump 204 and fuel flow through valve 208. For example, controller 12 may decrease air flow through pump 204 via decreasing an amount of electric power that is delivered to pump 204. Controller 12 may decrease fuel flow to fuel cell 129 by decreasing an opening amount of valve 208.

In this way, controller 12 may increase or decrease an amount of electric power that may be generated via fuel cell 129. Controller 12 may adjust the amount of electric power as described in the method of FIGS. 10 and 11.

Referring now to FIG. 3, a sketch showing data sources for anticipating vehicle acceleration and deceleration is shown. Vehicles 302-308 may transmit data that indicates the application of brake and accelerator pedals to vehicle 121. The data transmitted by each vehicle may include a position of the vehicle so that controller 12 in vehicle 121 may determine the distance and location of vehicles 302-308 relative to vehicle 121. Vehicles 302-308 may transmit vehicle data via transmitters or transceivers 302a-308a.

In one example, vehicle 121 may anticipate application of an accelerator pedal of vehicle 121 via a human or autonomous driver in response to vehicles 302 and 304 beginning to move and/or application of accelerator pedals in vehicles 304 and 302. For example, if vehicle 304 sends an indication that vehicle 304 is beginning to accelerate and move while vehicle 302 and vehicle 121 are stopped, vehicle 121 may anticipate that vehicle 302 will begin to move, thereby allowing vehicle 121 to move so that electrical output of a fuel cell of vehicle 121 may be increased before vehicle 121 actually begins to move. By increasing the electrical output of the fuel cell of vehicle 121 before vehicle 121 is commanded to move, electrical output of the fuel cell of vehicle 121 may be increased so that by the time torque to propel vehicle 121 is requested, the fuel cell of vehicle 121 is generating an amount of electric power that may be sufficient to meet the driver demand power amount. In this way, the requested driver demand power may be timely met via the fuel cell.

Similarly, vehicle 121 may anticipate application of a brake pedal and deceleration of vehicle 121 via a human or autonomous driver in response to the brake pedals of vehicles 302 and 304 beginning to be applied. In one example, vehicle 121 may attempt to anticipate vehicle acceleration or vehicle deceleration a predetermined amount of time in the future via braking data and acceleration data from vehicles 302 and 304. For example, if vehicle 304 sends an indication that vehicle 304 is beginning to decelerate due to a brake pedal of vehicle 304 being applied while vehicle 302 and vehicle 121 are following vehicle 304, vehicle 121 may anticipate that vehicle 302 will begin to slow. Vehicle 121 may then anticipate that it will be slowing so that electrical output of a fuel cell of vehicle 121 may be decreased before vehicle 121 actually begins to slow or the driver demand power is reduced. By decreasing the electrical output of the fuel cell of vehicle 121 before vehicle 121 is commanded to slow, electrical output of the fuel cell of vehicle 121 may be decreased so that by the time a brake pedal of vehicle 121 is applied, the fuel cell of vehicle 121 is generating a lower amount of electric power so that a greater amount of the vehicle's kinetic energy may be stored to an electric energy storage device. In this way, fuel efficiency of the fuel cell may be improved and a greater portion of a vehicle's kinetic energy may be stored in an electric energy storage device.

Referring now to FIG. 4, a sketch showing infrastructure that may communicate with vehicle 121 and objects that a camera of vehicle 121 may view that may be applied to anticipate vehicle acceleration and deceleration are shown.

Traffic control system 402 may provide an indication that a traffic signal will be changing from a first state to a second state in a predetermined amount of time. For example, traffic control system 402 may indicate that a traffic light will change from red to green 2 seconds in the future so that vehicle 121 may adjust output power of a fuel cell. In particular, electric output power of a fuel cell may be increased via increasing a flow of oxygen and fuel to the fuel cell in response to a signal that the traffic light will be changing from red to green. By increasing electric output power of the fuel cell before the traffic light changes in response to the indication that the traffic signal will be changing in a short amount of time, it may be possible for output of the fuel cell output power to meet the driver demand power when the traffic light changes from red to green so that driver demand power may be met without the vehicle's electric machine receiving power from the electric energy storage device. Similarly, traffic control system 402 may indicate that a traffic light will change from yellow to red 2 seconds in the future by sending a signal to vehicle 121 so that vehicle 121 may be requested to stop traveling before passing by the traffic light. The indication that the traffic light will be changing from yellow to red may allow vehicle 121 to anticipate a reduction in driver demand power to slow the vehicle since the indication may be provided a predetermined amount of time before the traffic light or signal actually changes state. Specifically, vehicle 121 may anticipate a reduction in driver demand torque via the indication or signal that the light will change from yellow to red and reduce fuel cell output so that the vehicle's electric energy storage device may store a greater portion of the vehicle's kinetic energy in the form of electrical energy. By decreasing electric output power of the fuel cell before the traffic light actually changes state, it may be possible for output of the fuel cell output power to be near zero when the traffic light changes from yellow to red so that the electric energy storage device may store a larger portion of the vehicle's kinetic energy. This may increase vehicle efficiency and driving range.

In some examples, vehicle 121 may also process images from camera 155 shown in FIG. 1 to anticipate vehicle acceleration and deceleration. For example, vehicle 121 may recognize that a traffic signal changes from red to green before a driver of the vehicle releases the vehicle brake and applies the vehicle's accelerator pedal. The recognition of the traffic signal changing state may be applied to anticipate that vehicle deceleration and a lower driver demand power may be soon to follow. The vehicle 121 may respond to the traffic light changing state via increasing output of the fuel cell before driver demand power is reduced in response to the light changing state. Thus, vehicle 121 may anticipate the reduction in driver demand power and reduce output of the fuel cell responsive to the anticipation. Electric energy that is generated by the fuel cell before the vehicle's human or autonomous driver applies the accelerator pedal may be stored in the vehicle's electric energy storage device. Conversely, vehicle 121 may recognize that a traffic signal changes from yellow to red before a driver of the vehicle applies the vehicle brake and releases the vehicle's accelerator pedal as vehicle 121 approaches a traffic signal. The vehicle 121 may respond to the traffic light changing state via decreasing output of the fuel cell. Decreasing output of the fuel cell may allow vehicle 121 to store a greater portion of the vehicle's kinetic energy during vehicle stopping. Vehicle 121 may also judge where it may be stopped based on visible markers 404 (e.g., vehicle stop line, traffic signs, etc.) so that it may predict a rate of vehicle deceleration so that an amount of power that may be stored to the vehicle's electric energy storage device during vehicle stopping and a rate at which the power is produced may be estimated. The estimate of the rate of power generation may be a basis for adjusting a rate at which power of the fuel cell is adjusted.

Referring now to FIG. 5, a sketch showing additional sources that may be the basis for anticipating increasing or decreasing electrical power output of a fuel cell are shown. FIG. 5 shows vehicle 121 may travel on different routes to travel to different locations. Along the travel paths 501 and 502, vehicle 121 may be exposed to active and passive information. The active information may be transmitted to vehicle 121 via a transmission station or tower 515, a satellite 505, or a second vehicle 511. The tower 515 may provide access to a cloud server computer 555 that may store vehicle and/or travel route data. Vehicle 121 may also receive travel route data (e.g., road surface conditions, road grade, traffic stoppage data, etc.) via a transmitter 512 of second vehicle 511. Vehicle 121 may also detect stationary traffic signs (e.g., speed limit signs, stop signs, yield signs, etc.) that do not change operating state 506 via the vehicle's on-board camera 155. Further, vehicle 121 may sense road grade via an inclinometer an vehicle speed to anticipate if driver demand is expected to decrease due to road grade, vehicle speed, and the road speed limit. Such inputs may be applied to anticipate vehicle acceleration and deceleration as described in FIGS. 10 and 11.

Figure 6:
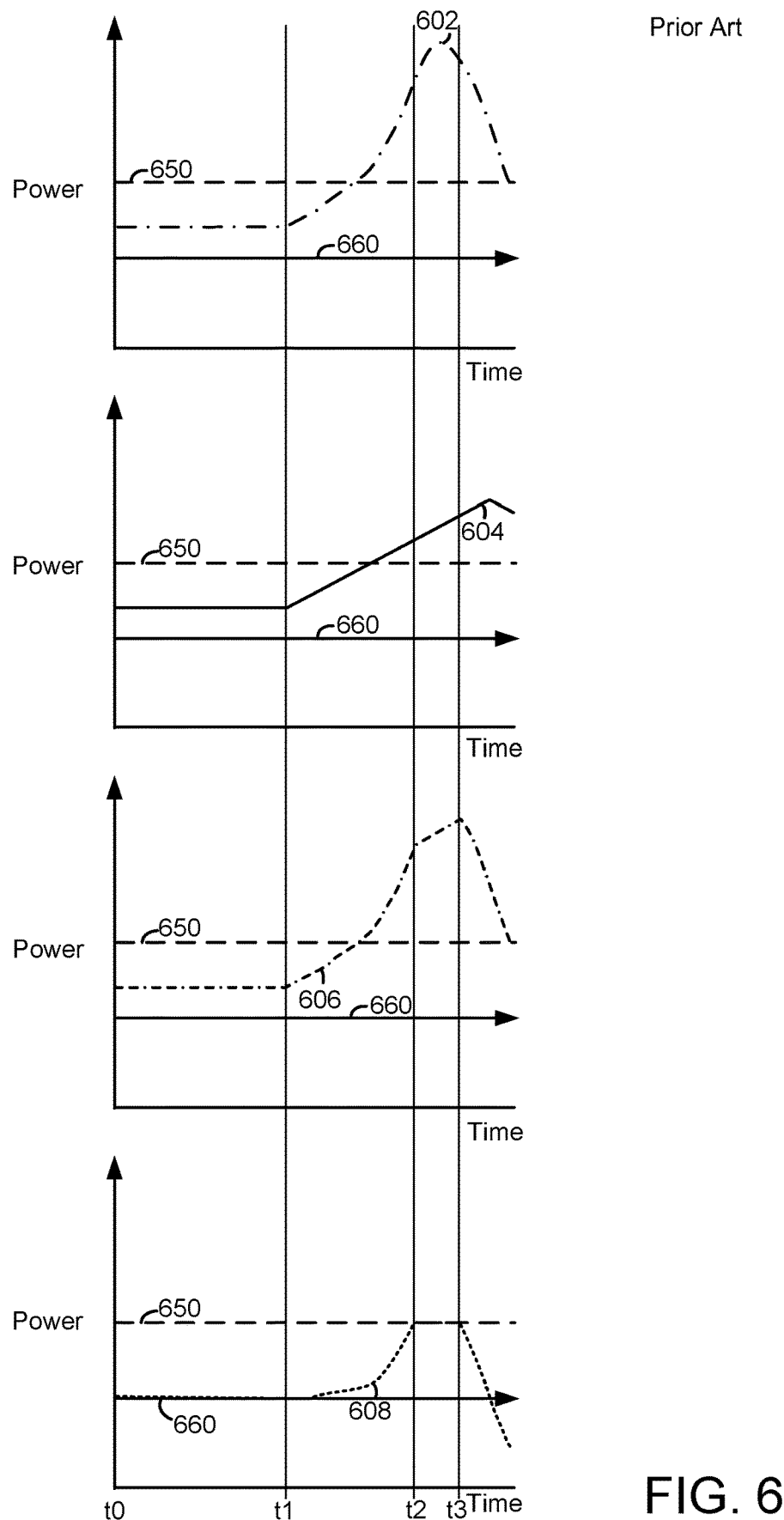
FIGS. 6 and 7 show plots of fuel cell operation in the absence of anticipating driver demand power.

Referring now to FIG. 6, an example prior art prophetic vehicle operating sequence is shown. The systems of FIGS. 1 and 2 may provide the operating sequence. The vertical lines at times t0-t3 represent times of interest during the sequence. The plots are aligned in time and occur at a same time.

The first plot from the top of FIG. 6 is a plot of driver demand power (e.g., power requested by the vehicle's human or autonomous driver to propel the vehicle) versus time. The vertical axis represents an amount of power and the amount of power increases in the direction of the vertical axis arrow. The horizontal axis represents time and time increases from the left side of the plot to the right side of the plot. Line 602 represents a driver demand power. Horizontal line 650 represents a power limit for the electric energy storage device that is not to be exceeded. Horizontal axis 660 is at a level where power is equal to zero. Power amounts above horizontal axis 660 are positive and power amounts below horizontal axis 660 are negative.

The second plot from the top of FIG. 6 is a plot of fuel cell power output (e.g., fuel cell electrical power output amount) versus time. The vertical axis represents an amount of power and the amount of power increases in the direction of the vertical axis arrow. The horizontal axis represents time and time increases from the left side of the plot to the right side of the plot. Line 604 represents a fuel cell power output. Horizontal line 650 represents a power limit for the electric energy storage device that is not to be exceeded. Horizontal axis 660 is at a level where power is equal to zero. Power amounts above horizontal axis 660 are positive and power amounts below horizontal axis 660 are negative.

The third plot from the top of FIG. 6 is a plot of electric machine power (e.g., power output by the vehicle's propulsive force electric machine) versus time. The vertical axis represents an amount of power and the amount of power increases in the direction of the vertical axis arrow. The horizontal axis represents time and time increases from the left side of the plot to the right side of the plot. Line 606 represents electric machine power. Horizontal line 650 represents a power limit for the electric energy storage device that is not to be exceeded. Horizontal axis 660 is at a level where power is equal to zero. Power amounts above horizontal axis 660 are positive and power amounts below horizontal axis 660 are negative.

The fourth plot from the top of FIG. 6 is a plot of electric energy storage device power (e.g., battery power) versus time. The vertical axis represents an amount of power and the amount of power increases in the direction of the vertical axis arrow. The horizontal axis represents time and time increases from the left side of the plot to the right side of the plot. Line 608 represents an amount of electrical energy storage unit power. Horizontal line 650 represents a power limit for the electric energy storage device that is not to be exceeded. Horizontal axis 660 is at a level where power is equal to zero. Power amounts above horizontal axis 660 are positive and power amounts below horizontal axis 660 are negative.

Between time t0 and time t1, the electric energy storage power output is zero and the fuel cell output power is a lower level. The electric machine power output is also at a lower level, but the electric machine power output is a little less than the fuel cell output power due to electric machine efficiency. The electric machine power output is equal to the driver demand power.

At time t1, the driver demand power begins to increase in response to greater application of an accelerator pedal (not shown). The fuel cell power output is increased to match the driver demand power and the electric energy storage unit power output is zero. The electric machine output increases to match the driver demand power.

Between time t1 and time t2, the driver demand power continues to increase and it increases at a rate that is greater than a rate that power output from the fuel cell may be increased. The electric energy storage device begins to output power to the electric machine so that the electric machine power output matches the driver demand power output. The fuel cell power output continues to increase.

At time t2, the driver demand power continues to increase and the electric energy storage device power is maintained at threshold 650 to reduce the possibility of electric energy storage device degradation. Since output of electric energy storage device is held at level 650, output power of the electric machine no longer meets the increasing driver demand torque. Rather, the rate of electric machine power increase is limited to the same rate of power increase output as the fuel cell.

Between time t2 and time t3, the driver demand power increases and then it begins to decrease. The electric machine power provides a portion of the driver demand power but not all of the driver demand power since the electric energy storage device output is maintained below threshold 650. The electric machine output power increases as power output of the fuel cell increases, and output of the fuel cell continues to increase to meet the driver demand power. The area where curve 606 is not equal to curve 602 is a power deficiency that may not be supplied via the electric energy storage device.

At time t3, the driver demand power is reduced to a level where output of the electric energy storage device may be reduced. The output power of the fuel cell continues to increase since the driver demand power is greater than output power of the fuel cell. The output power of the electric machine is reduced to match the driver demand power.

Thus, the prior art method fails to match the electric machine output to the driver demand between times t2 and t3 because electric energy storage device output is limited and because fuel cell output power may not be increased at a rate that is equal to the rate of driver demand torque increase.

Figure 7:
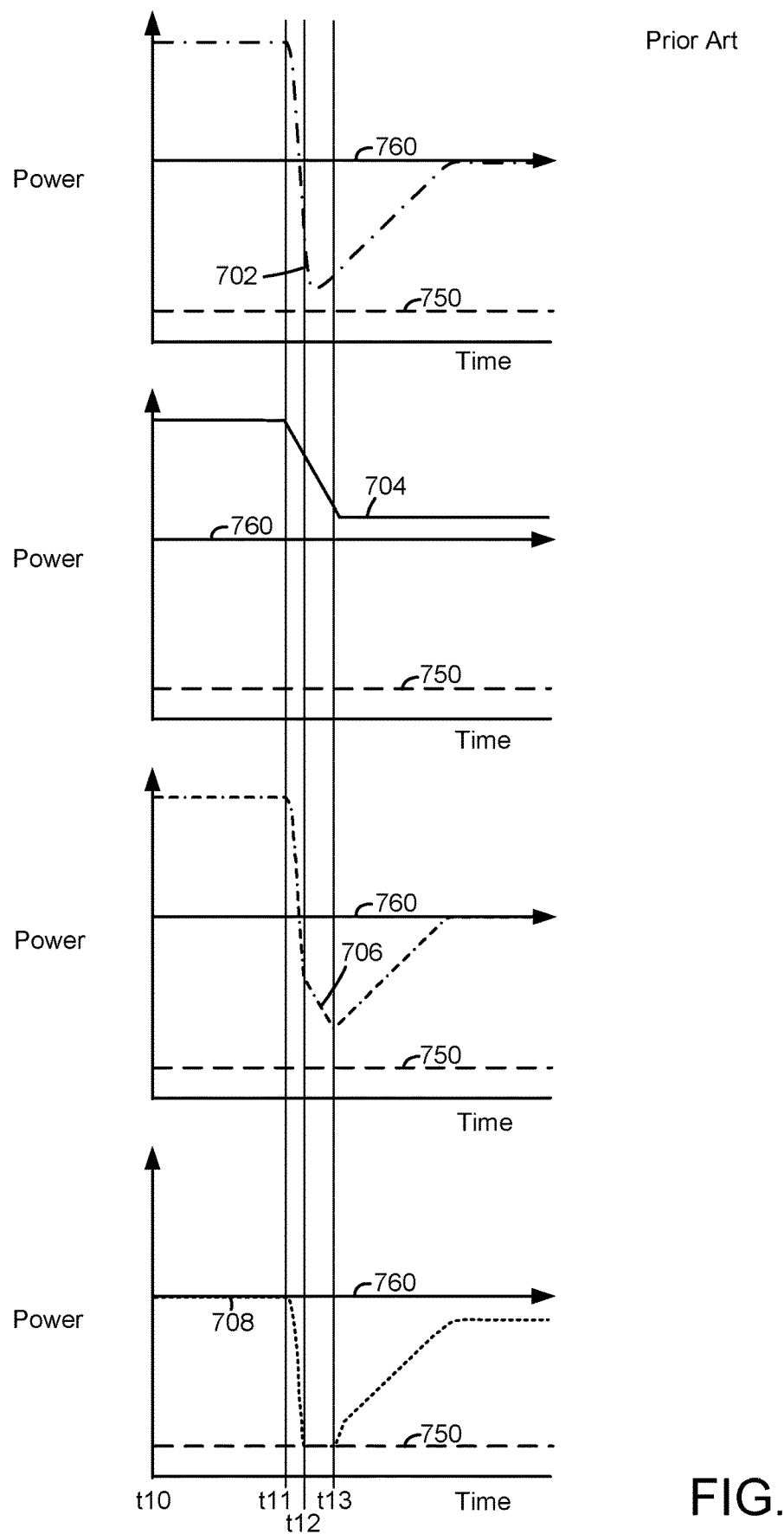

Referring now to FIG. 7, an example prior art prophetic vehicle operating sequence is shown. The systems of FIGS. 1 and 2 may provide the operating sequence. The vertical lines at times t10-t13 represent times of interest during the sequence. The plots are aligned in time and occur at a same time.

The first plot from the top of FIG. 7 is a plot of driver demand power (e.g., power requested by the vehicle's human or autonomous driver to propel the vehicle) versus time. The vertical axis represents an amount of power and the amount of power increases in the direction of the vertical axis arrow. The horizontal axis represents time and time increases from the left side of the plot to the right side of the plot. Line 702 represents a driver demand power. Horizontal line 750 represents a power limit for the electric energy storage device that is not to be exceeded. Horizontal axis 760 is at a level where power is equal to zero. Power amounts above horizontal axis 760 are positive and power amounts below horizontal axis 760 are negative.

The second plot from the top of FIG. 7 is a plot of fuel cell power output (e.g., fuel cell electrical power output amount) versus time. The vertical axis represents an amount of power and the amount of power increases in the direction of the vertical axis arrow. The horizontal axis represents time and time increases from the left side of the plot to the right side of the plot. Line 704 represents a fuel cell power output. Horizontal line 750 represents a power limit for the electric energy storage device that is not to be exceeded. Horizontal axis 760 is at a level where power is equal to zero. Power amounts above horizontal axis 760 are positive and power amounts below horizontal axis 760 are negative.

The third plot from the top of FIG. 7 is a plot of electric machine power (e.g., power output by the vehicle's propulsive force electric machine) versus time. The vertical axis represents an amount of power and the amount of power increases in the direction of the vertical axis arrow. The horizontal axis represents time and time increases from the left side of the plot to the right side of the plot. Line 706 represents electric machine power. Horizontal line 750 represents a power limit for the electric energy storage device that is not to be exceeded. Horizontal axis 760 is at a level where power is equal to zero. Power amounts above horizontal axis 760 are positive and power amounts below horizontal axis 760 are negative.

The fourth plot from the top of FIG. 7 is a plot of electric energy storage device power (e.g., battery power) versus time. The vertical axis represents an amount of power and the amount of power increases in the direction of the vertical axis arrow. The horizontal axis represents time and time increases from the left side of the plot to the right side of the plot. Line 708 represents an amount of electrical energy storage unit power. Horizontal line 750 represents a power limit for the electric energy storage device that is not to be exceeded. Horizontal axis 760 is at a level where power is equal to zero. Power amounts above horizontal axis 760 are positive and power amounts below horizontal axis 760 are negative.

Between time t10 and time t11, the electric energy storage power output is zero and the fuel cell output power is a higher level to meet driver demand power. The electric machine power is also at a higher level to meet the driver demand power.

At time t11, the driver demand power begins to decrease in response to a reduced application of an accelerator pedal (not shown). The fuel cell power output is decreased to match the driver demand power and the electric machine output is reduced to meet the reduced driver demand power. The electric energy storage unit power output is zero.

Between time t11 and time t12, the driver demand power continues to decrease and it changes from positive to negative. The negative driver demand power causes the electric machine to switch from operating as a motor to operating as a generator. Electric power that is generated by the electric machine is delivered to the electric energy storage device and the electric energy storage device power turns negative to indicate that the electric energy storage device is storing electric power from the electric machine. The fuel cell output power continues to decrease but it is well above the driver demand power so the electric power from the fuel cell is also stored in the electric energy storage device.

At time t12, the driver demand power continues to decrease and the electric energy storage device power is maintained at threshold 750 to reduce the possibility of electric energy storage device degradation. Since output of electric energy storage device is held at level 750 and the fuel cell is continuing to output power, the electric machine may not supply additional power to the energy storage device. Therefore, the magnitude of electric power produced by the electric machine is rate limited to a same rate that output of the fuel cell is decreasing, except with an opposite sign. For example, if the fuel cell output power may be reduced at a rate 2 kilowatts/second, then the electric machine may increase power delivered to the electric energy storage device at a rate of 2 kilowatts/second. Operating the system in this way allows the electric energy storage device power magnitude to not exceed threshold 750. The fuel cell output power continues to be decreased in response to the driver demand power.

Between time t12 and time t13, the driver demand power continues decreasing and then it begins to increase. The electric machine output provides only a portion of the driver demand power but not all of the driver demand power since the electric energy storage device power is maintained above threshold 750. The electric machine output power magnitude increases as power output of the fuel cell decreases, and output of the fuel cell continues to decrease to meet the driver demand power. The area where curve 706 is not equal to curve 702 is power from the vehicle's kinetic energy that is not available to store in the electric energy storage device.

At time t13, the driver demand power magnitude is decreasing and the magnitude of power that is supplied to the electric energy storage device via the electric machine begins to decrease. The fuel cell output power continues to decrease since the driver demand power is negative.

Figure 8:
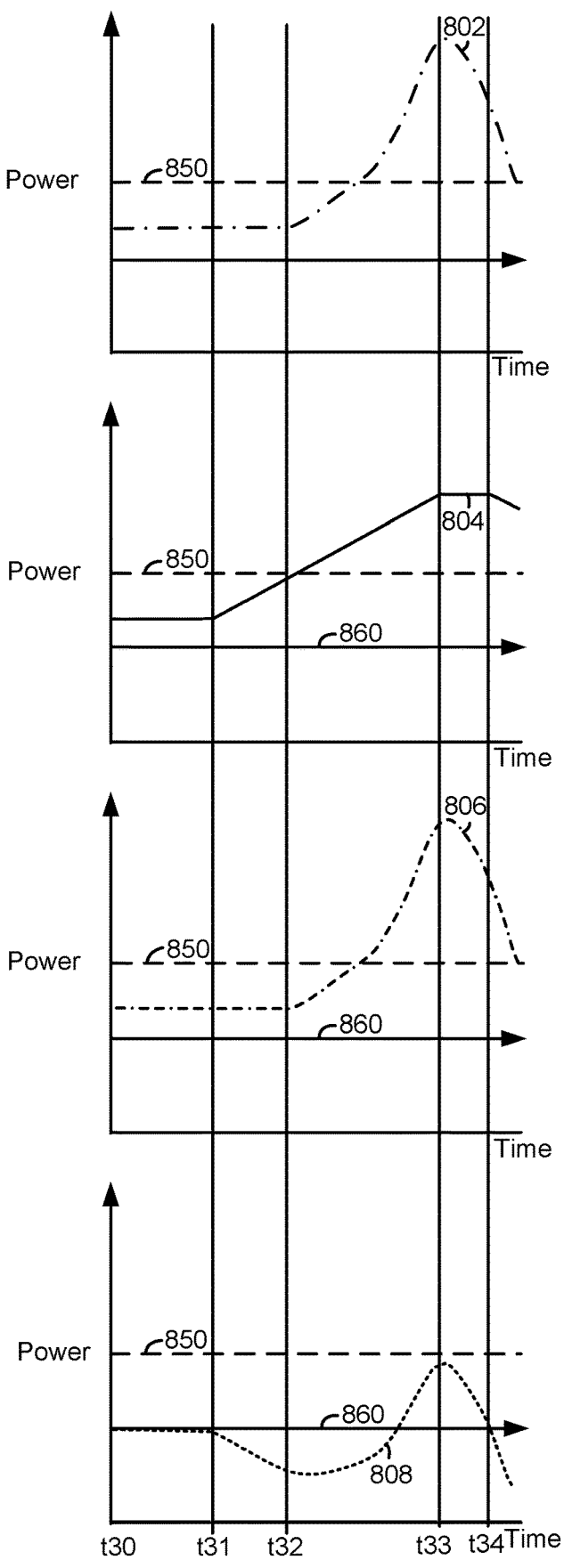
FIGS. 8 and 9 show plots of fuel cell operation in the presence of anticipating driver demand power.

Referring now to FIG. 8, an example prophetic vehicle operating sequence according to the method of FIGS. 10 and 11 in cooperation with the controller of FIGS. 1 and 2 is shown. The systems of FIGS. 1 and 2 may provide the operating sequence. The vertical lines at times t30-t34 represent times of interest during the sequence. The plots are aligned in time and occur at a same time.

The first plot from the top of FIG. 8 is a plot of driver demand power (e.g., power requested by the vehicle's human or autonomous driver to propel the vehicle) versus time. The vertical axis represents an amount of power and the amount of power increases in the direction of the vertical axis arrow. The horizontal axis represents time and time increases from the left side of the plot to the right side of the plot. Line 802 represents a driver demand power. Horizontal line 850 represents a power limit for the electric energy storage device that is not to be exceeded. Horizontal axis 860 is at a level where power is equal to zero. Power amounts above horizontal axis 860 are positive and power amounts below horizontal axis 860 are negative.

The second plot from the top of FIG. 8 is a plot of fuel cell power output (e.g., fuel cell electrical power output amount) versus time. The vertical axis represents an amount of power and the amount of power increases in the direction of the vertical axis arrow. The horizontal axis represents time and time increases from the left side of the plot to the right side of the plot. Line 804 represents a fuel cell power output. Horizontal line 850 represents a power limit for the electric energy storage device that is not to be exceeded. Horizontal axis 860 is at a level where power is equal to zero. Power amounts above horizontal axis 860 are positive and power amounts below horizontal axis 860 are negative.

The third plot from the top of FIG. 8 is a plot of electric machine power (e.g., power output by the vehicle's propulsive force electric machine) versus time. The vertical axis represents an amount of power and the amount of power increases in the direction of the vertical axis arrow. The horizontal axis represents time and time increases from the left side of the plot to the right side of the plot. Line 806 represents electric machine power. Horizontal line 850 represents a power limit for the electric energy storage device that is not to be exceeded. Horizontal axis 860 is at a level where power is equal to zero. Power amounts above horizontal axis 860 are positive and power amounts below horizontal axis 860 are negative.

The fourth plot from the top of FIG. 8 is a plot of electric energy storage device power (e.g., battery power) versus time. The vertical axis represents an amount of power and the amount of power increases in the direction of the vertical axis arrow. The horizontal axis represents time and time increases from the left side of the plot to the right side of the plot. Line 808 represents an amount of electrical energy storage unit power. Horizontal line 850 represents a power limit for the electric energy storage device that is not to be exceeded. Horizontal axis 860 is at a level where power is equal to zero. Power amounts above horizontal axis 860 are positive and power amounts below horizontal axis 860 are negative.

Between time t30 and time t31, the electric energy storage power output is zero and the fuel cell output power is a lower level. The electric machine power is also at a lower level, but the electric machine power output is a little less than the fuel cell output power due to electric machine efficiency. The electric machine power is equal to the driver demand power.

At time t31, the driver demand power is unchanged, but the fuel cell electric power output begins to increase in response to an indication of a pending greater application of an accelerator pedal (not shown). The indication may be provided via infrastructure, other vehicles, global positioning data and map data, or based on data stored in controller memory. The fuel cell power output is increased to a level that is above the driver demand power so that if the driver demand increases at a faster rate at a time in the future, the fuel cell may have capacity to provide the power that is requested via the driver demand power. Excess electric charge generated by the fuel cell may be stored in the electric energy storage device. Accordingly, the electric power of the electric energy storage device is shown moving negative to indicate that the electric energy storage device is receiving charge. The electric machine power is equal to the driver demand power.

At time t32, the driver demand power begins to increase and the electric energy storage device continues to store charge from the fuel cell. The output power of the fuel cell continues to increase and the electric machine power is equal to the driver demand power.

Between time t33 and time t34, the driver demand power increases and then it begins to decrease. The electric machine output provides all of the driver demand power even though output power of the fuel cell has reached its maximum level. The output power from the electric energy storage device swings from negative to positive. Thus, the electric energy storage device goes from storing charge to sourcing charge. The output power from the electric energy storage device flows to the electric machine so that the electric machine may meet the driver demand torque.

At time t34, the driver demand power is reduced to a level where output of the fuel cell may be reduced. The output power of the electric energy storage device is near zero and the electric machine power output is equal to the driver demand power.

In this way, the power output of the fuel cell may be increased before a driver demand increases by anticipating the increase in driver demand before the actual driver demand changes so that driver demand may be met via the electric machine. The driver demand may be met by electric power that is provided via the fuel cell and the electric energy storage device. By beginning to increase power output of the fuel cell before the driver demand increases, it may be possible to prevent the electric energy storage device from reaching its maximum value so that driver demand power may be met.

Figure 9:
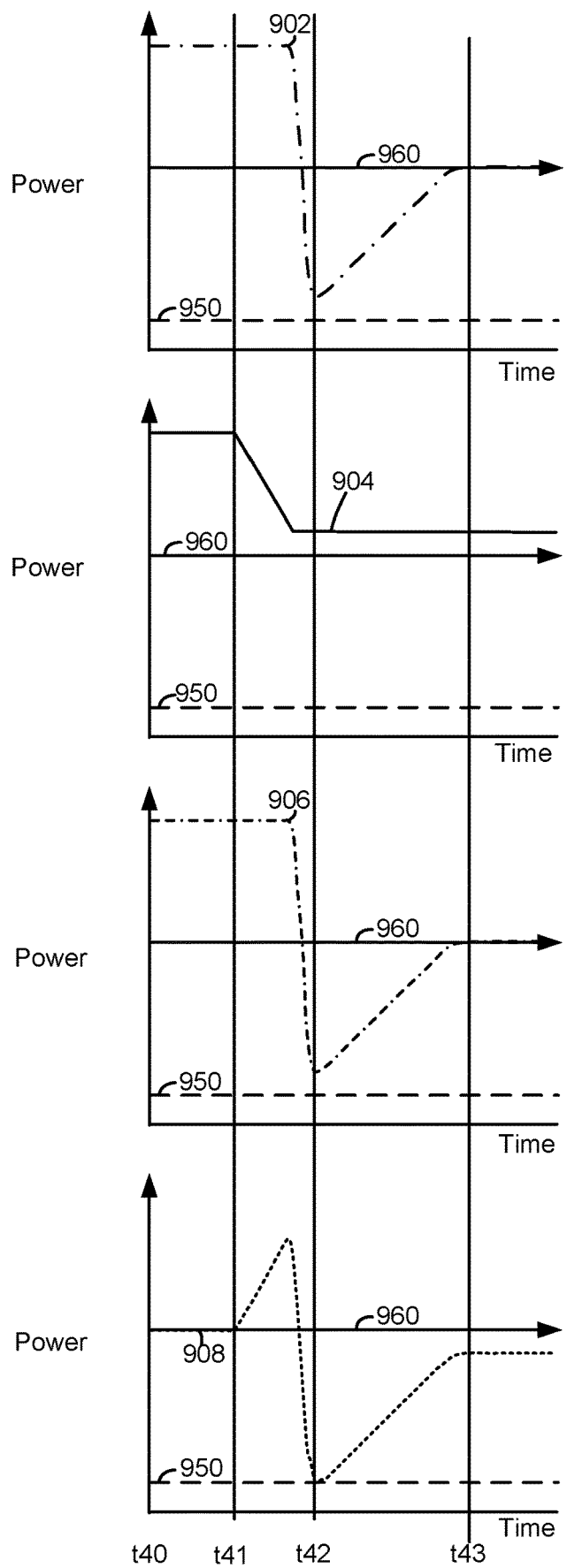
Figure 10:
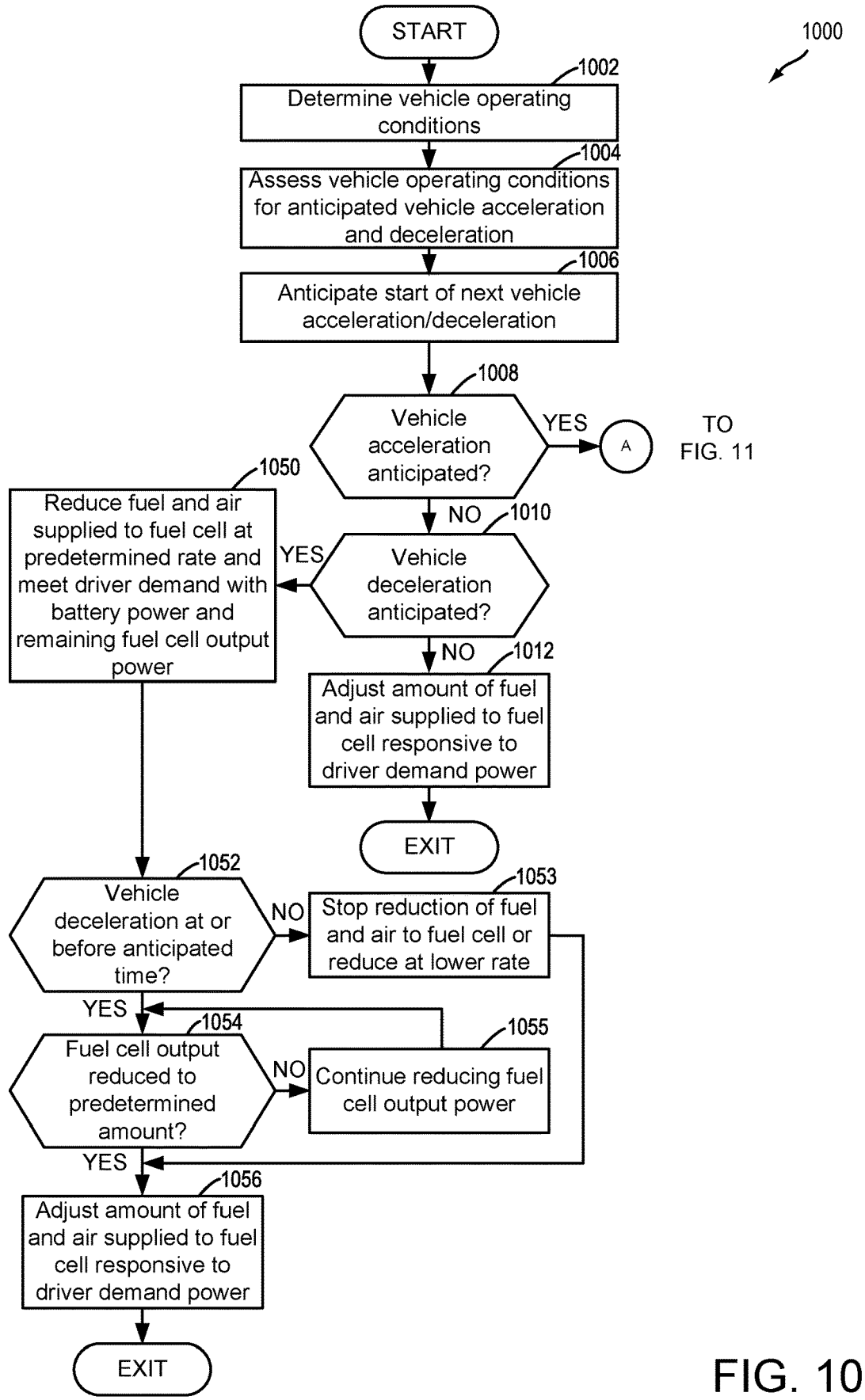
FIGS. 10 and 11 show a method for operating a fuel cell of a vehicle.
Figure 11:
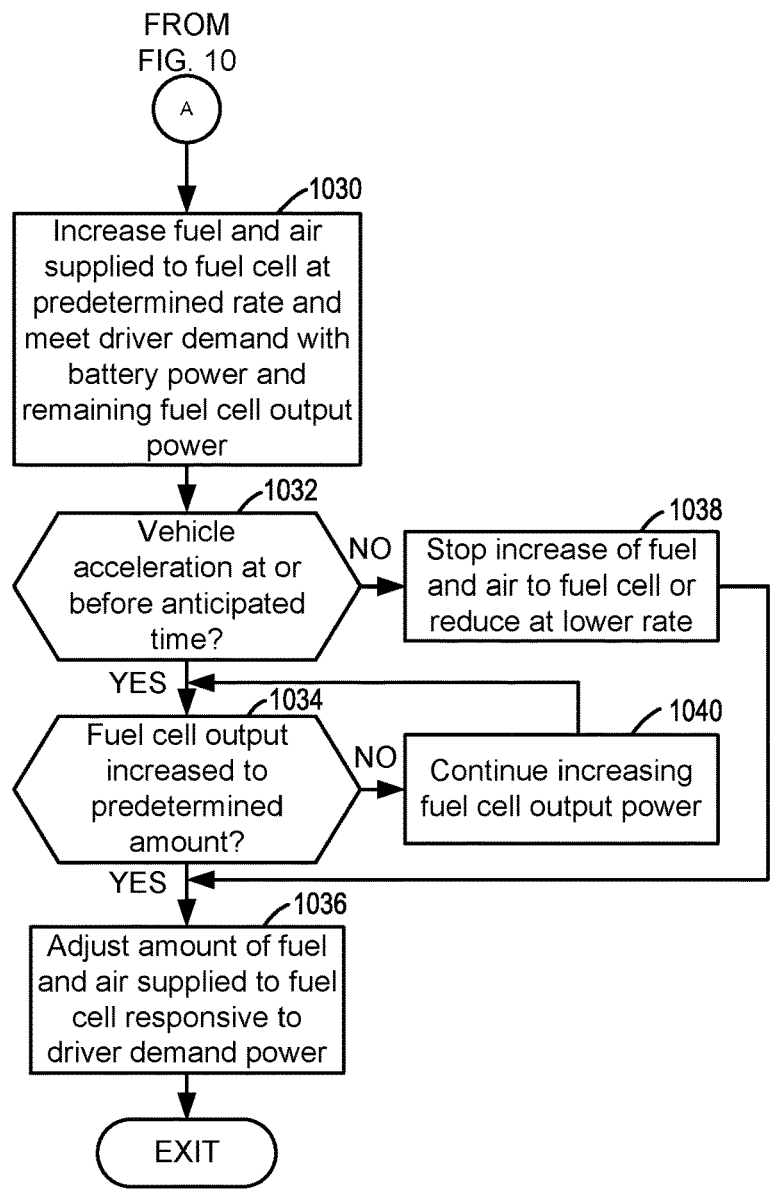

Referring now to FIG. 9, an example prophetic vehicle operating sequence according to the method of FIGS. 10 and 11 in cooperation with the controller of FIGS. 1 and 2 is shown. The systems of FIGS. 1 and 2 may provide the operating sequence. The vertical lines at times t40-t43 represent times of interest during the sequence. The plots are aligned in time and occur at a same time.

The first plot from the top of FIG. 9 is a plot of driver demand power (e.g., power requested by the vehicle's human or autonomous driver to propel the vehicle) versus time. The vertical axis represents an amount of power and the amount of power increases in the direction of the vertical axis arrow. The horizontal axis represents time and time increases from the left side of the plot to the right side of the plot. Line 902 represents a driver demand power. Horizontal line 950 represents a power limit for the electric energy storage device that is not to be exceeded. Horizontal axis 960 is at a level where power is equal to zero. Power amounts above horizontal axis 960 are positive and power amounts below horizontal axis 960 are negative.

The second plot from the top of FIG. 9 is a plot of fuel cell power output (e.g., fuel cell electrical power output amount) versus time. The vertical axis represents an amount of power and the amount of power increases in the direction of the vertical axis arrow. The horizontal axis represents time and time increases from the left side of the plot to the right side of the plot. Line 904 represents a fuel cell power output. Horizontal line 950 represents a power limit for the electric energy storage device that is not to be exceeded. Horizontal axis 960 is at a level where power is equal to zero. Power amounts above horizontal axis 960 are positive and power amounts below horizontal axis 960 are negative.

The third plot from the top of FIG. 9 is a plot of electric machine power (e.g., power output by the vehicle's propulsive force electric machine) versus time. The vertical axis represents an amount of power and the amount of power increases in the direction of the vertical axis arrow. The horizontal axis represents time and time increases from the left side of the plot to the right side of the plot. Line 906 represents electric machine power. Horizontal line 950 represents a power limit for the electric energy storage device that is not to be exceeded. Horizontal axis 960 is at a level where power is equal to zero. Power amounts above horizontal axis 960 are positive and power amounts below horizontal axis 960 are negative.

The fourth plot from the top of FIG. 9 is a plot of electric energy storage device power (e.g., battery power) versus time. The vertical axis represents an amount of power and the amount of power increases in the direction of the vertical axis arrow. The horizontal axis represents time and time increases from the left side of the plot to the right side of the plot. Line 908 represents an amount of electrical energy storage unit power. Horizontal line 950 represents a power limit for the electric energy storage device that is not to be exceeded. Horizontal axis 960 is at a level where power is equal to zero. Power amounts above horizontal axis 960 are positive and power amounts below horizontal axis 960 are negative.

Between time t40 and time t41, the electric energy storage power output is zero and the fuel cell output power is a higher level. The electric machine power is also at a higher level and the electric machine power output is a little less than the fuel cell output power due to electric machine efficiency. The electric machine power output is equal to the driver demand power.

At time t41, the fuel cell output begins to decrease in anticipation of the driver demand power beginning to decrease in response to reduced application of an accelerator pedal (not shown). The decrease in driver demand power may be anticipated via on-board vehicle sensors, infrastructure, global positioning systems, and cloud based data received from other vehicles. The driver demand power is unchanged and the electric energy storage unit power output begins to increases so that the electric machine may meet the driver demand power even though power output of the fuel cell is decreasing.

Between time t41 and time t42, the driver demand power begins to decrease and it decreases at a rate that is greater than a rate that power output from the fuel cell may be decreased. The electric energy storage device begins to store charge that is generated via the electric machine and the fuel cell. The electric machine output follows the driver demand power.

At time t42, the driver demand power continues reaches its minimum value during the sequence and since the fuel cell power output is low, the electric energy storage device is able to absorb all of the output of the electric machine.

Between time t42 and time t43, the magnitude of the driver demand power decreases toward zero. The electric machine output provides driver demand power and the electric energy storage device stores the power output of the electric machine. The fuel cell output power is low and it remains at the lower level.

At time t43, the driver demand power is reduced to zero and the fuel cell output power is at a lower level. The electric machine output power is also reduced to zero and the electric energy storage device is storing electric charge that is output from the fuel cell.

In this way, the power output of the fuel cell may be decreased before a driver demand decreases so that driver demand may be met via the electric machine when the vehicle is in a regeneration mode where the vehicle's kinetic energy is converted into electric energy. The driver demand may be met by storing charge that is generated via the electric machine into the electric energy storage device. By beginning to decrease power output of the fuel cell before the driver demand decreases, it may be possible to prevent the electric energy storage device from reaching its maximum charge storing level so that a greater portion of the vehicle's kinetic energy may be stored in the electric energy storage device.

Referring now to FIGS. 10 and 11, a method for controlling torque delivery of a vehicle axle is shown. The method of FIGS. 10 and 11 may be incorporated into and may cooperate with the system of FIGS. 1 and 2. Further, at least portions of the method of FIGS. 10 and 11 may be incorporated as executable instructions stored in non-transitory memory while other portions of the method may be performed via a controller transforming operating states of devices and actuators in the physical world.

At 1002, method 1000 determines vehicle operating conditions. Vehicle operating conditions may include but are not limited to accelerator pedal position, brake pedal position, vehicle speed, driver demand power, electric machine output power, fuel cell output power, and various limits that may be stored in controller memory. In one example, accelerator pedal position and vehicle speed are used to reference or index a table to determine the driver demand power that is supplied to vehicle wheels via the electric machine 120. The values in the table may be empirically determined values of driver demand power. The values may be determined via operating the vehicle on a dynamometer and adjusting values in the table until desired vehicle performance metrics are achieved. The driver demand power is an electric machine output power, but in some examples it may be a wheel power level. Method 1000 proceeds to 404.

At 1004, method 1000 accesses vehicle operating conditions to determine whether or not vehicle acceleration or vehicle deceleration may be anticipated. In one example, method 100 receives braking and acceleration data from vehicles that are traveling a same path as the present vehicle. If one or more of the vehicles are braking, then method 1000 may anticipate that the present vehicle will be decelerating soon and that driver demand power will be reduced since the present vehicle is following the vehicles that are braking. Similarly, if one or more of the vehicles are accelerating via accelerator pedals being depressed, then method 1000 may anticipate that the present vehicle will be accelerating soon and that driver demand power will be increased since the present vehicle is following the vehicles that are accelerating. Further, method 1000 may receive traffic and route data from infrastructure (e.g., traffic signals and systems, cloud server computers, global positioning systems and maps stored in controller memory, and human driver characteristics stored in controller memory) a predetermined amount of time before events actually occur so that method 1000 may increase or decrease output of the fuel cell. For example, if method 1000 receives data from a traffic light that is in the path of the present vehicle indicating that the traffic light will change from yellow to green in two seconds, then method 1000 may anticipate the reduction in driver demand torque that may be due to the traffic signal and reduce fuel cell output before the light actually changes operating state. \

Method 1000 may also receive data from sensors that are aboard the vehicle (e.g., camera, vehicle speed, radar/lidar data, global positioning data, etc.) and anticipate increases in driver demand power or decreases in driver demand power. For example, the vehicle's camera may detect a stationary stop sign in the distance. The stop sign may be a basis for anticipating a reduction in driver demand power. In particular, method 1000 may anticipate reducing driver demand power when the present vehicle is within a threshold distance of the stop sign so that fuel cell output power may be reduced to a lower level when the driver demand is actually reduced and the vehicle enters a regenerative braking mode. Similarly, the camera may detect a traffic light changing state from red to green when the present vehicle is stopped. The controller may anticipate driver demand power increasing in response to the traffic signal changing state before the present vehicle's driver actually increases the driver demand power in response to the traffic signal changing state and traffic beginning to move. Method 1000 proceeds to 1006.

At 1006, method 1000 anticipates timing and power magnitude of a next vehicle acceleration or deceleration. Method 1000 may anticipate accelerations and decelerations in response to data received at 1004. For example, method 1000 may anticipate a vehicle acceleration in response to an indication of a traffic signal changing from red to green in a predetermined amount of time, vehicle data indicating that vehicles in the present vehicle's path are beginning to accelerate, the vehicle entering a highway entrance, the present vehicle passing by a stop sign, radar or lidar of the present vehicle indicating a path of travel of the present vehicle has cleared, etc. The timing of the anticipation may be a function of when the data indicating changes in driver demand power are received. Similarly, method 1000 may anticipate deceleration of the present vehicle in response to an indication of a traffic signal changing from yellow to red in a predetermined amount of time, vehicle data indicating that vehicles in the present vehicle's path are beginning to decelerate, the vehicle exiting a highway, the present vehicle approaching a stop sign, radar or lidar of the present vehicle indicating a path of travel of the present vehicle is blocked, etc. Method 1000 may respond to an indication of impending vehicle acceleration or deceleration upon receiving the indication of impending vehicle acceleration or deceleration, and the indication may be provide up to five seconds before the actual vehicle acceleration or deceleration. The data for anticipating vehicle acceleration or deceleration may be output to the present vehicle a predetermined amount of time (e.g., two or three seconds) before the acceleration or deceleration is anticipated so that there is two to three seconds of anticipating the vehicle acceleration or deceleration. Further, the data may include timing values to indicate when the event (e.g., traffic signal changing state, bridge closing/opening, etc.) will occur so that the controller may anticipate a change in driver demand power.

Method 1000 may also estimate a maximum magnitude of driver demand power during the next vehicle acceleration or deceleration. In one example, method 1000 may estimate a maximum driver demand power amount (e.g., driver demand power amount having a greatest magnitude permitted) that may be requested based on driver demand power levels that were requested during past vehicle accelerations that were similar to the presently anticipated vehicle acceleration. For example, if the present vehicle is entering a highway and the present human driver requested 20 kilowatts of additional power to accelerate the vehicle during a previous entry on to a highway, then method 1000 may anticipate that the same driver will request a maximum of 20 kilowatts of additional power to accelerate the present vehicle under similar circumstances. Likewise, if the present vehicle is exiting a highway and the present human driver requested −20 kilowatts to decelerate the vehicle during a prior exit of a highway, then method 1000 may anticipate that the same driver will request −20 kilowatts to decelerate the present vehicle under similar circumstances.

Method 1000 may also estimate a rate of change of driver demand power during the next vehicle acceleration or deceleration. In one example, method 1000 may estimate a driver power amount rate of change based on driver demand power level rates of change that were requested during past vehicle accelerations that were similar to the presently anticipated vehicle acceleration. For example, if the present vehicle is entering a highway and the present human driver requested 2 kilowatts/second to accelerate the vehicle during a previous entry on to a highway, then method 1000 may anticipate that the same driver will request 2 kilowatts/second to accelerate the present vehicle under similar circumstances. Likewise, if the present vehicle is exiting a highway and the present human driver requested −2 kilowatts/second to decelerate the vehicle during a prior exit of a highway, then method 1000 may anticipate (e.g., predict an event at a time before the event actually takes place) that the same driver will request −2 kilowatts/second to decelerate the present vehicle under similar circumstances. Method 1000 proceeds to 1008.

At 1008, method 1000 judges if vehicle acceleration is anticipated within a predetermined time frame (e.g., within the next 3 seconds). If the data received at 1006 indicates that vehicle acceleration may occur within a threshold amount of time (e.g., three seconds), then the answer is yes and method 1000 proceeds to 1030. Otherwise, the answer is no and method 1000 proceeds to 1010.

At 1010, method 1000 judges if vehicle deceleration is anticipated within a predetermined time frame (e.g., within the next 3 seconds). If the data received at 1006 indicates that vehicle deceleration may occur within a threshold amount of time (e.g., three seconds), then the answer is yes and method 1000 proceeds to 1050. Otherwise, the answer is no and method 1000 proceeds to 1012.

At 1012, method 1000 adjusts the amount of air and fuel that are supplied to the fuel cell responsive to the driver demand power level. Thus, for higher driver demand power levels, method 1000 may provide a greater amount of air and fuel to the fuel cell. On the other hand, for lower driver demand power levels, method 1000 may provide a lesser amount of air and fuel to the fuel cell. The amount of fuel that is supplied to the fuel cell may be adjusted via adjusting a position of a valve (e.g., 208 of FIG. 2). The amount of air that is supplied to the fuel cell may be adjusted via adjusting an amount of electric power provided to a pump (e.g., 204 of FIG. 2). Method 1000 proceeds to exit.

At 1050, method 1000 begins to reduce the amount of fuel and air that are supplied to the fuel cell in response to the anticipated reduction in driver demand power. In one example, method 1000 reduces the amount of fuel and air that are supplied to the fuel cell at a predetermined rate (e.g., a maximum rate of power reduction for the fuel cell) while the power output of the fuel cell is greater than a threshold amount. Optionally, method 1000 may adjust the amount of fuel and air that are supplied to the fuel cell responsive to the estimated rate of change in the driver demand power and the maximum driver demand that may be expected. For example, if the present power output of the fuel cell is 25 kilowatts and the electric machine is consuming the 25 kilowatts, and it is anticipated that the driver demand power will decrease to 5 kilowatts over a time period of two seconds (e.g., a rate of 10 kilowatts/second) based on similar vehicle deceleration characteristics stored in controller memory, then method 1000 may reduce the power output of the fuel cell beginning two seconds before the deceleration is requested by the driver at least partially releasing the accelerator pedal at a rate of 5 kilowatts/sec so that the fuel cell output power matches the driver demand power four seconds in the future.

Method 1000 also meets the present driver demand power via the electric machine consuming power from the electric energy storage device and the fuel cell. As fuel cell output decreases, additional energy may be supplied via the electric energy storage device to meet the driver demand power. Method 1000 proceeds to 1052.

At 1052, method 1000 judges if the vehicle deceleration occurs a predetermined amount of time after or before the time when vehicle acceleration was predicted. Method 1000 may wait at 1052 for a predetermined amount of time to make the determination. For example, method 1000 may have judged that vehicle deceleration would be requested two seconds in the future based on data provided via infrastructure, vehicle sensors, or other sources mentioned herein, but the human driver may have at least partially released the accelerator pedal or applied the brake pedal before or within a predetermined amount of time after the two seconds, then the answer is yes and method 1000 proceeds to 1054. Otherwise, the answer is no and method 1000 proceeds to 1053. A judgement of no indicates that the vehicle's driver has not taken the anticipated action, while a judgement of yes indicates that the vehicle's driver has taken the anticipated action.

At 1053, method may cease reducing the air and fuel amounts that are supplied to the fuel cell. Alternatively, method 1000 may reduce the rate of the reduction in the air and fuel amounts that are supplied to the fuel cell. For example, if the amount of air and fuel supplied to the fuel cell initially reduce fuel cell output power by 2 kilowatts/second, then method 1000 may reduce fuel cell output power by 0.5 kilowatts/second after the absence of actual vehicle deceleration is determined at the anticipated time. This may allow the fuel cell to recover to a higher output sooner if the driver demand power is increased, yet it still allows the fuel cell output to be reduced during deceleration conditions so that a greater amount of the vehicle's kinetic energy may be stored in the electric energy storage device. However, in some examples, method 1000 may continue to reduce air and fuel amounts that are supplied to the fuel cell up to a time when the output of the fuel cell is at a predetermined level (e.g., the magnitude of the fuel cell output has declined by the amount estimated at 1006). Method 1000 proceeds to 1056.

At 1054, method 1000 judges if the fuel cell output power is reduced to a predetermined amount. The predetermined amount may be a minimum power output level for the fuel cell (e.g., 0.5) kilowatts. In another example, the predetermined amount may be the driver demand power that is anticipated for a time when the vehicle is expected to decelerate or accelerate multiplied by an efficiency factor for the fuel electric machine. For example, if the driver demand torque is anticipated to be 3 kilowatts during vehicle deceleration and the present driver demand power is 30 kilowatts, then the predetermined amount may be 3 kilowatts of power. Thus, if the fuel cell output power is 3 kilowatts or less, then the answer is yes and method 1000 proceeds to 1056. Otherwise, the answer is no and method 1000 proceeds to 1055. However, if the driver demand power increases instead of decreasing, method 1000 proceeds immediately to 1056.

At 1055, method 1000 continues to reduce output power of the fuel cell. The output power of the fuel cell may be reduced via reducing an amount of air and fuel that is supplied to the fuel cell. Method 1000 returns to 1054.

At 1056, method 1000 adjusts the amount of air and fuel that are supplied to the fuel cell responsive to the driver demand power level. Thus, for higher driver demand power levels, method 1000 may provide a greater amount of air and fuel to the fuel cell. On the other hand, for lower driver demand power levels, method 1000 may provide a lesser amount of air and fuel to the fuel cell. The amount of fuel that is supplied to the fuel cell may be adjusted via adjusting a position of a valve (e.g., 208 of FIG. 2). The amount of air that is supplied to the fuel cell may be adjusted via adjusting an amount of electric power provided to a pump (e.g., 204 of FIG. 2). Method 1000 proceeds to exit.

At 1030, method 1000 begins to increase the amount of fuel and air that are supplied to the fuel cell. In one example, method 1000 increases the amount of fuel and air that are supplied to the fuel cell at a predetermined rate (e.g., a maximum rate of power reduction for the fuel cell) while the power output of the fuel cell is less than a threshold amount. Optionally, method 1000 may adjust the amount of fuel and air that are supplied to the fuel cell responsive to the estimated rate of change in the driver demand power and the maximum driver demand that may be expected. For example, if the present power output of the fuel cell a little greater than 15 kilowatts and the electric machine is providing 15 kilowatts of propulsive force, and it is anticipated that the driver demand power will increase to 35 kilowatts over a time period of two seconds (e.g., a rate of 10 kilowatts/second) based on similar vehicle deceleration characteristics stored in controller memory, then method 1000 may increase the power output of the fuel cell beginning two seconds before the time that the actual acceleration is anticipated to occur by the driver applying the accelerator pedal at a rate of 5 kilowatts/sec so that the fuel cell output power matches the driver demand power four seconds in the future.

Method 1000 also stores the excess power that is generated via the fuel cell in the electric energy storage device. In particular, as fuel cell output increases due to anticipating an increase in driver demand power, additional energy may be supplied via the electric energy storage device to conserve energy. Method 1000 proceeds to 1032.

At 1032, method 1000 judges if the vehicle acceleration occurs a predetermined amount of time after or before the time when vehicle acceleration was predicted. Method 1000 may wait at 1032 for a predetermined amount of time to make the determination. For example, method 1000 may have judged that vehicle acceleration would be requested two seconds in the future based on data provided via infrastructure, vehicle sensors, or other sources mentioned herein, but the human driver may have applied the accelerator pedal before or within a predetermined amount of time after the two seconds, then the answer is yes and method 1000 proceeds to 1034. Otherwise, the answer is no and method 1000 proceeds to 1038. A judgement of no indicates that the vehicle's driver has not taken the anticipated action, while a judgement of yes indicates that the vehicle's driver has taken the anticipated action.

At 1038, method may cease increasing the air and fuel amounts that are supplied to the fuel cell. Alternatively, method 1000 may reduce the rate of the reduction in the air and fuel amounts that are supplied to the fuel cell. For example, if the amount of air and fuel supplied to the fuel cell initially increased fuel cell output power by 2 kilowatts/second, then method 1000 may increase fuel cell output power by 0.5 kilowatts/second after the absence of actual vehicle deceleration is determined at the anticipated time. This may allow the fuel cell to recover to a lower output sooner if the driver demand power is decreased, yet it still allows the fuel cell output to be increased during acceleration conditions so that a greater amount of the driver demand power may be provided via the electric machine. However, in some examples, method 1000 may continue to increase air and fuel amounts that are supplied to the fuel cell up to a time when the output of the fuel cell is at a predetermined level (e.g., the magnitude of the fuel cell output has increased by the amount estimated at 1006). Method 1000 proceeds to 1036.

At 1034, method 1000 judges if the fuel cell output power is increased to a predetermined amount. The predetermined amount may be a maximum power output level for the fuel cell (e.g., 160) kilowatts. In another example, the predetermined amount may be the driver demand power that is anticipated for a time when the vehicle is expected to accelerate multiplied by an efficiency factor for the fuel electric machine. For example, if the driver demand torque is anticipated to be 80 kilowatts during vehicle acceleration and the present driver demand power is 3 kilowatts, then the predetermined amount may be 80 kilowatts of power. Thus, if the fuel cell output power is 80 kilowatts or more, then the answer is yes and method 1000 proceeds to 1036. Otherwise, the answer is no and method 1000 proceeds to 1040. However, if the driver demand power decreases instead of increasing, method 1000 proceeds immediately to 1036.

At 1040, method 1000 continues to increase output power of the fuel cell. The output power of the fuel cell may be increased via increasing an amount of air and fuel that is supplied to the fuel cell. Method 1000 returns to 1034.

At 1036, method 1000 adjusts the amount of air and fuel that are supplied to the fuel cell responsive to the driver demand power level. Thus, for higher driver demand power levels, method 1000 may provide a greater amount of air and fuel to the fuel cell. On the other hand, for lower driver demand power levels, method 1000 may provide a lesser amount of air and fuel to the fuel cell. The amount of fuel that is supplied to the fuel cell may be adjusted via adjusting a position of a valve (e.g., 208 of FIG. 2). The amount of air that is supplied to the fuel cell may be adjusted via adjusting an amount of electric power provided to a pump (e.g., 204 of FIG. 2). Method 1000 proceeds to exit.

Thus, the method of FIGS. 10 and 11 provide for a vehicle operating method, comprising: anticipating a reduction in driver demand power via a controller; reducing power output of a fuel cell to an electric machine in response to anticipating the reduction in driver demand power before the reduction in driver demand power; and increasing electric power consumed from an electric energy storage device via the electric machine in response to reducing power output of the fuel cell. The method includes where the driver demand power is reduced via at least partially releasing an accelerator pedal. The method further comprises reducing an amount of fuel and air supplied to the fuel cell to reduce power output of the fuel cell. The method further comprises receiving data from one or more vehicles, not including the vehicle having the fuel cell, to anticipate the reduction in driver demand power. The method includes where the data indicates that the one or more vehicles are decelerating. The method further comprises receiving data from infrastructure to anticipate the reduction in driver demand power. The method includes where the infrastructure includes a traffic signaling system.

The method of FIGS. 10 and 11 also provides for a vehicle operating method, comprising: anticipating a reduction in driver demand power via a controller; reducing electric power output of a fuel cell to an electric machine in response to anticipating the reduction in driver demand power before the reduction in driver demand power; increasing electric power consumed from an electric energy storage device via the electric machine in response to reducing power output of the fuel cell; anticipating an increase in driver demand power via the controller; and increasing electric power output of the fuel cell to the electric energy storage device in response to anticipating the increase in driver demand power before the increase in driver demand power. The method includes where the anticipating includes retrieving vehicle operating data from controller memory. The method includes where the anticipating includes retrieving data from a global positioning system. The method includes where the anticipating includes retrieving data from a plurality of vehicles other than a vehicle that includes the controller. The method includes where the anticipating includes estimating a magnitude of the reduction in driver demand power. The method includes where the anticipating includes estimating a rate of change in the magnitude of the reduction in driver demand power. The method further comprises limiting reducing the electric power output of the fuel cell in response to no indication of the reduction in driver demand power within a predetermined amount of time after anticipating the reduction in driver demand power. The method further comprises reducing a rate of reducing the electric power output of the fuel cell in response to no indication of the reduction in driver demand power within a predetermined amount of time after anticipating the reduction in driver demand power.

In another representation, the method of FIGS. 10 and 11 provide for a vehicle operating method, comprising: anticipating a reduction in driver demand power via a controller; reducing power output of a fuel cell to an electric machine at a first rate in response to anticipating the reduction in driver demand power before the reduction in driver demand power; and reducing the power output of the fuel cell to the electric machine at a second rate in response to no reduction in driver demand power before and a threshold amount of time after a time when the reduction in driver demand power is anticipated to occur. The method includes where the second rate is lower than the first rate. The method includes where the anticipation is based on a global positioning system.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
via a controller,
anticipating a reduction in driver demand power without receiving a reduction in the driver demand power;
reducing power output of a fuel cell to an electric machine in response to the anticipated reduction in the driver demand power before actually receiving a reduction in the driver demand power, where the anticipated reduction in the driver demand power is a prediction that an operator requested output of a vehicle propulsion system is going to be reduced; and
increasing electric power consumed from an electric energy storage device via the electric machine in response to reducing power output of the fuel cell; then
determining no indication to reduce the driver demand power has been received and that the vehicle is still without the reduction in the driver torque demand within a predetermined amount of time after anticipating the reduction driver demand torque; and
in response to there being no indication to reduce the driver demand power and the vehicle still being without the reduction in the driver torque demand within the predetermined amount of time after anticipating the reduction in driver demand power, reducing the electric power output of the fuel cell to the electric machine, and reducing a rate at which the electric power output of the fuel cell is reduced.

2. The method of claim 1, where the driver demand power is reduced via at least partially releasing an accelerator pedal and where reducing power output of the fuel cell is at a rate that is less than a rate of the anticipated reduction in driver demand power.

3. The method of claim 1, further comprising reducing an amount of fuel and air supplied to the fuel cell to reduce power output of the fuel cell in response to anticipating the reduction in driver demand power.

4. The method of claim 1, further comprising receiving data from one or more vehicles, not including the vehicle having the fuel cell, to anticipate the reduction in driver demand power.

5. The method of claim 4, where the data indicates that the one or more vehicles are decelerating.

6. The method of claim 4, further comprising receiving data from infrastructure to anticipate the reduction in driver demand power.

7. The method of claim 6, where the infrastructure includes a traffic signaling system.

8. A vehicle operating method, comprising:
via a controller of a vehicle,
anticipating a reduction in driver demand power without receiving a reduction in the driver demand power;
reducing electric power output of a fuel cell to an electric machine in response to the anticipated reduction in a driver demand power before an actual reduction in the driver demand power is received, where the anticipated reduction in the driver demand power includes anticipating that the vehicle is going to be slowed; and
increasing electric power consumed from an electric energy storage device via the electric machine in response to reducing power output of the fuel cell; then
determining no indication to reduce the driver demand power has been received and that the vehicle is still without the reduction in the driver torque demand within a predetermined amount of time after anticipating the reduction driver demand torque; and
in response to there being no indication to reduce the driver demand power and the vehicle still being without the reduction in the driver torque demand within the predetermined amount of time after anticipating the reduction in driver demand power, reducing the electric power output of the fuel cell to the electric machine, and reducing a rate at which the electric power output of the fuel cell is reduced; and then
anticipating an increase in driver demand power via the controller; and
increasing electric power output of the fuel cell to the electric energy storage device in response to anticipating the increase in driver demand power before the increase in driver demand power.

9. The method of claim 8, where the anticipating includes retrieving vehicle operating data from controller memory and where reducing electric power output of the fuel cell is at a rate that is less than a rate of the anticipated reduction in driver demand power.

10. The method of claim 9, where the anticipating includes retrieving data from a global positioning system and further comprising:
switching from delivering the amount of power delivered to the electric energy storage device to supplying power from the electric energy storage device to the electric machine in response to the increase in the driver demand power.

11. The method of claim 8, where the anticipating includes retrieving data from a plurality of vehicles other than a vehicle that includes the controller.

12. The method of claim 8, where the anticipating includes estimating a magnitude of the reduction in driver demand power and where increasing electric power output of the fuel cell is at a rate that is greater than a rate of the anticipated increase in the driver demand power.

13. The method of claim 8, where the anticipating includes estimating a rate of change in the magnitude of the reduction in driver demand power.

14. The method of claim 8, further comprising limiting reducing the electric power output of the fuel cell in response to no indication of the reduction in driver demand power within a predetermined amount of time after anticipating the reduction in driver demand power.

15. A vehicle system, comprising:
a vehicle including an accelerator pedal;
a fuel cell;
an electric energy storage device;
an electric machine coupled to a wheel; and
a controller including executable instructions stored in non-transitory memory to:
anticipate a reduction in a driver demand power via the controller in response to data retrieved from off-board the vehicle without receiving a reduction in the driver demand power, and to decrease power output of the fuel cell in response to anticipating the reduction in driver demand power without receiving an actual reduction in the driver demand power, then
determine no indication to reduce the driver demand power has been received and that the vehicle is still without the reduction in the driver torque demand within a predetermined amount of time after anticipating the reduction driver demand torque, and
in response to there being no indication to reduce the driver demand power and the vehicle still being without the reduction in the driver torque demand within the predetermined amount of time after anticipating the reduction in driver demand power, reducing the electric power output of the fuel cell to the electric machine, and reducing a rate at which the electric power output of the fuel cell is reduced,
where the anticipated reduction in the driver demand power is a prediction that an operator requested output of a vehicle propulsion system is going to be reduced.

16. The vehicle system of claim 15, further comprising:
additional instructions to request data from one or more vehicles to anticipate the reduction in driver demand power.

17. The vehicle system of claim 15, further comprising additional instructions to anticipate an increase in driver demand power.

18. The vehicle system of claim 17, further comprising additional instructions to decrease fuel and air supplied to the fuel cell in response to anticipating the reduction in driver demand power.

19. The vehicle system of claim 15, where the data retrieved from off-board the vehicle is retrieved from infrastructure.

* * * * *